(12) United States Patent
Jang et al.

(10) Patent No.: US 8,854,489 B2
(45) Date of Patent: Oct. 7, 2014

(54) IMAGE PROCESSING METHOD AND IMAGE PROCESSING APPARATUS

(75) Inventors: Soon-geun Jang, Seongnam-si (KR); Tae-hong Min, Seoul (KR); Rae-hong Park, Seoul (KR); Hwan-soon Sung, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 742 days.

(21) Appl. No.: 13/034,764

(22) Filed: Feb. 25, 2011

(65) Prior Publication Data
US 2012/0038797 A1 Feb. 16, 2012

(30) Foreign Application Priority Data
Aug. 16, 2010 (KR) ........................ 10-2010-0078856

(51) Int. Cl.
| | | |
|---|---|---|
| H04N 5/228 | (2006.01) | |
| H04N 5/235 | (2006.01) | |
| G06T 5/50 | (2006.01) | |
| G06T 5/00 | (2006.01) | |

(52) U.S. Cl.
CPC ................ *H04N 5/2355* (2013.01); *G06T 5/50* (2013.01); *G06T 2207/10144* (2013.01); *G06T 5/008* (2013.01)

USPC ....................................................... 348/222.1

(58) Field of Classification Search
USPC ....................................................... 348/222.1
See application file for complete search history.

(56) References Cited

U.S. PATENT DOCUMENTS

2006/0133688 A1* 6/2006 Kang et al. ..................... 382/254
2011/0058050 A1* 3/2011 Lasang et al. .............. 348/208.4

* cited by examiner

*Primary Examiner* — James Hannett
(74) *Attorney, Agent, or Firm* — Drinker Biddle & Reath LLP

(57) ABSTRACT

An image processing apparatus and an image processing method, the method including: providing one or more low dynamic range images having different exposure levels; classifying each of the one of more low dynamic range images as a saturation region, an under-saturation region, and a non-saturation region with respect to an intensity value; generating feature maps indicating a similarity between patterns of the non-saturation regions; generating final feature maps converting pixels included in the feature maps into moving pixels and non-moving pixels; defining moving regions and non-moving regions included in the one or more low dynamic range images; removing noise from the moving regions and the non-moving regions by using a first noise reduction filter for the moving regions and a second noise reduction filter for the non-moving regions; and generating a radiance map corresponding to the one or more low dynamic range images.

23 Claims, 7 Drawing Sheets

IMAGE PROCESSING METHOD AND IMAGE PROCESSING APPARATUS

CROSS-REFERENCE TO RELATED PATENT APPLICATION

This application claims the benefit of Korean Patent Application No. 10-2010-0078856, filed on Aug. 16, 2010, in the Korean Intellectual Property Office, the entire disclosure of which is incorporated herein by reference.

BACKGROUND

1. Field of the Invention

The invention relates to an image processing method and an image processing apparatus for improved high dynamic range imaging.

2. Description of the Related Art

High dynamic range imaging (HDRI) allows a luminance range of a real natural image perceived by human eyes to be represented in a digital image. The HDRI may have a wide range of applications such as in medical imaging, satellite imaging, physical substrate rendering, digital cinema, and the like. The HDRI generates a radiance map having a high dynamic range through one or more low dynamic range images having different degrees of exposure and generates a display image to be displayed on a digital display device by using tone mapping.

However, when a user captures low dynamic images, the images may overlap due to a movement of a subject or a change in the background, thus making it difficult to compose the captured images to form the HDRI.

Furthermore, when the user captures low dynamic images in a low illumination or high sensitivity condition, noise occurs during the HDRI, which deteriorates image quality.

SUMMARY

Therefore, there is a need in the art for an image processing method and an image processing apparatus that prevent images from overlapping during high dynamic range imaging (HDRI) and remove noise.

According to an aspect of the invention, there is provided an image processing apparatus including: a low dynamic range image providing unit configured to provide one or more low dynamic range images having different exposure levels; a saturation region detecting unit configured to classify each of the one of more low dynamic range images as a saturation region, an under-saturation region, and a non-saturation region with respect to an intensity value; a feature map generating unit configured to compare the non-saturation regions of the one of more low dynamic range images and generating feature maps indicating a similarity between patterns of the non-saturation regions; a final feature map generating unit configured to convert pixels included in the feature maps into moving pixels and non-moving pixels and generating final feature maps; a moving region definition unit configured to compare the final feature maps and the one or more low dynamic range images and defining moving regions and non-moving regions included in the one or more low dynamic range images; a noise reduction unit configured to remove noise from the moving regions and the non-moving regions by using a first noise reduction filter for the moving regions and a second noise reduction filter for the non-moving regions; and a radiance map generating unit configured to generate a radiance map corresponding to the one or more low dynamic range images by making a weight of the moving regions from which noise is removed smaller than a weight of the non-moving regions from which noise is removed.

The image processing apparatus may include a global motion compensation unit configured to compensate for a global motion of each of the one or more low dynamic range images having different exposure levels.

The final feature map generating unit may include a ternary conversion unit configured to define the pixels included in the feature maps as moving pixels, unknown pixels, and non-moving pixels with respect to feature values; a binary conversion unit configured to convert the unknown pixels that are included in the feature maps and defined by the ternary conversion unit into the moving pixels or the non-moving pixels by using an average of brightness values of peripheral pixels as a threshold value; and a clustering unit configured to cluster the moving pixels and the non-moving pixels that are included in the feature maps and converted by the binary conversion unit and generating the final feature maps.

The low dynamic range image providing unit may be further configured to provide the one or more low dynamic range images as a first image that is insufficiently exposed, a second image that is appropriately exposed, and a third image that is excessively exposed.

The saturation region detecting unit may be further configured to divide each of a first image, a second image, and a third image into the saturation region, the under-saturation region, and the non-saturation region, respectively, and wherein the feature map generating unit may be further configured to compare the second image of the saturation region with the non-saturation region of the first image and to generate a first feature map indicating a similarity between patterns of the non-saturation region as a brightness value by using zero-mean normalized cross correlation (ZNCC), and to compare the second image of the saturation region with the non-saturation region of the third image and to generate a second feature map indicating a similarity between patterns of the non-saturation region as a brightness value by using the ZNCC.

The feature values may include a first feature value and a second feature value having a brightness value greater than the first feature value, and wherein the ternary conversion unit may further be configured to define the pixels as the moving pixels, if brightness values of the pixels included in the first feature map and the second feature map are smaller than the first feature value, to define the pixels as the unknown pixels, if the brightness values of the pixels included in the first feature map and the second feature map are greater than the first feature value and smaller than the second feature value, and to define the pixels as the non-moving pixels, if the brightness values of the pixels included in the first feature map and the second feature map are greater than the second feature value.

The binary conversion unit may be further configured to convert the unknown pixels into the moving pixels, if brightness values of the unknown pixels are smaller than the threshold value, and to convert the unknown pixels into the non-moving pixels, if brightness values of the unknown pixels are greater than the threshold value.

The clustering unit may further be configured to cluster the moving pixels and the non-moving pixels by applying a morphology operation to the moving pixels and the non-moving pixels.

The final feature maps may include a first final feature map corresponding to the first feature map and a second final feature map corresponding to the second feature map, and wherein the moving region definition unit may further be configured to compare the first final feature map with the first image and define the moving regions corresponding to the moving pixels and the non-moving regions corresponding to the non-moving pixels, and to compare the second final feature map with the third image and define the moving regions corresponding to the moving pixels and the non-moving regions corresponding to the non-moving pixels.

The first noise reduction filter may be a spatio-temporal noise reduction filter designed using a 3D structure tensor of the moving regions, and the second noise reduction filter is a spatial noise reduction filter designed using a 2D structure tensor of the non-moving regions.

The radiance map generating unit may be further configured to generate the radiance map corresponding to the first image, the second image, and the third image by using a Debevec and Malik method by making the weight of the moving regions from which noise is removed smaller than that of the non-moving regions from which noise is removed.

According to another aspect of the invention, there is provided an image processing method including: providing one or more low dynamic range images having different exposure levels; classifying each of the one of more low dynamic range images as a saturation region, an under-saturation region, and a non-saturation region with respect to an intensity value; comparing the non-saturation regions of the one of more low dynamic range images and generating feature maps indicating a similarity between patterns of the non-saturation regions; defining the pixels included in the feature maps as moving pixels, unknown pixels, and non-moving pixels with respect to feature values; converting the unknown pixels included in the feature maps into the moving pixels or the non-moving pixels by using an average of brightness values of peripheral pixels as a threshold value; and clustering the moving pixels and the non-moving pixels included in the feature maps having the converted unknown pixels and generating the final feature maps converting pixels included in the feature maps into moving pixels and non-moving pixels and generating final feature maps; comparing the final feature maps and the one or more low dynamic range images and defining moving regions and non-moving regions included in the one or more low dynamic range images; removing noise from the moving regions and the non-moving regions by using a first noise reduction filter for the moving regions and a second noise reduction filter for the non-moving regions; and generating a radiance map corresponding to the one or more low dynamic range images by making a weight of the moving regions from which noise is removed smaller than a weight of the non-moving regions from which noise is removed.

The image processing method may further include: compensating for a global motion of each of the one or more low dynamic range images having different exposure levels.

The one or more low dynamic range images may include a first image that is insufficiently exposed, a second image that is appropriately exposed, and a third image that is excessively exposed.

Each of the first image, the second image, and the third image may be divided into the saturation region, the under-saturation region, and the non-saturation region, respectively, wherein the generating of the feature maps includes: comparing the second image of the saturation region with the non-saturation region of the first image and generating a first feature map indicating a similarity between patterns of the non-saturation region as a brightness value by using ZNCC, and comparing the second image of the saturation region with the non-saturation region of the third image and generating a second feature map indicating a similarity between patterns of the non-saturation region as a brightness value by using the ZNCC.

The feature values may include a first feature value and a second feature value having a brightness value greater than the first feature value, wherein the defining of the pixels included in the feature maps as moving pixels, unknown pixels, and non-moving pixels includes: if brightness values of the pixels included in the first feature map and the second feature map are smaller than the first feature value, defining the pixels as the moving pixels, if the brightness values of the pixels included in the first feature map and the second feature map are greater than the first feature value and smaller than the second feature value, defining the pixels as the unknown pixels, and if the brightness values of the pixels included in the first feature map and the second feature map are greater than the second feature value, defining the pixels as the non-moving pixels.

The converting of the unknown pixels may include: if brightness values of the unknown pixels are smaller than the threshold value, converting the unknown pixels into the moving pixels, and if brightness values of the unknown pixels are greater than the threshold value, converting the unknown pixels into the non-moving pixels.

The clustering of the moving pixels and the non-moving pixels may include: clustering the moving pixels and the non-moving pixels by applying a morphology operation to the moving pixels and the non-moving pixels.

The final feature maps may include a first final feature map corresponding to the first feature map and a second final feature map corresponding to the second feature map, wherein the defining of the moving regions and the non-moving regions includes: comparing the first final feature map with the first image and defining the moving regions corresponding to the moving pixels and the non-moving regions corresponding to the non-moving pixels, comparing the second final feature map with the third image and defining the moving regions corresponding to the moving pixels and the non-moving regions corresponding to the non-moving pixels.

The first noise reduction filter may be a spatio-temporal noise reduction filter designed by using a 3D structure tensor of the moving regions, and the second noise reduction filter may be a spatial noise reduction filter designed by using a 2D structure tensor of the non-moving regions.

The generating of the radiance map may include: generating the radiance map corresponding to the first image, the second image, and the third image by using a Debevec and Malik method by making the weight of the moving regions from which noise is removed smaller than the weight of the non-moving regions from which noise is removed.

The one of more low dynamic range images may be captured under photographing conditions in which noise occurs.

An image processing method is disclosed. The image processing method may include capturing one or more low dynamic range images having different exposure levels; dividing each of the one of more low dynamic range images into regions including saturation region, under-saturation region, and a non-saturation region based on an intensity value of pixels of the images; determining a similarity between patterns of the non-saturation regions among the one or more low dynamic range images; defining moving regions and non-moving regions based on the determined similarity of the non-saturation regions among the one or more low dynamic range images; removing noise from the moving regions and the non-moving regions by using a first noise reduction filter for the moving regions and a second noise reduction filter for the non-moving regions; and generating a radiance map composed from the one or more low dynamic range images with the noise removed.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
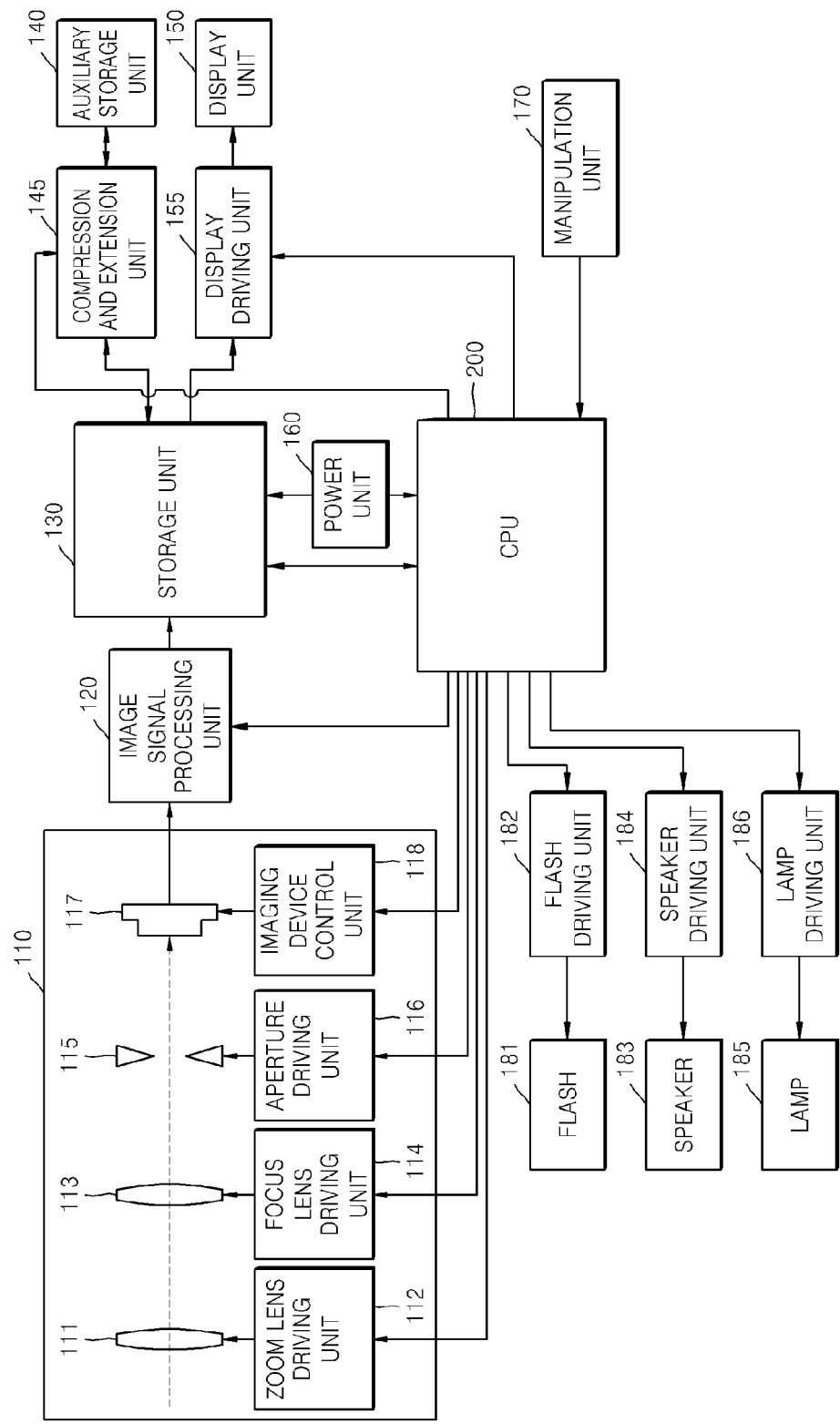
FIG. 1 is a block diagram of an image processing apparatus according to an exemplary embodiment of the invention.

The embodiments of the invention will be described below in more detail with reference to the accompanying drawings. Those components that are the same or correspond to each other are given the same reference numeral regardless of the figure number, and redundant explanations are omitted.

FIG. 1 is a block diagram of an image processing apparatus 100 according to an exemplary embodiment of the invention. The image processing apparatus 100 of FIG. 1 is a digital camera. However, the image processing apparatus of the current embodiment is not limited to the digital camera 100, and may be realized as various digital devices including a digital single-lens reflex camera (DSLR), a hybrid camera, and the like. The construction of the digital camera 100 will be described in detail according to the operation thereof.

In connection with a process of capturing an image of a subject, an optical signal of the subject passes through a zoom lens 111 and a focus lens 113 that is an optical system of an imaging unit 110, the amount of light is controlled according to opening and closing of an aperture 115, and an image of the subject is formed on a light-receiving surface of an imaging device 117. The image formed on the light-receiving surface of the imaging device 117 is converted into an electrical image signal through photoelectric conversion processing.

The imaging device 117 may be a charge-coupled device (CCD) image sensor or a complementary metal oxide semiconductor (CMOS) image sensor (CIS) that converts an optical signal into an electric signal. The aperture 115 is in a closed state or in an open state when an auto-focusing algorithm is performed according to a first release signal generated by pressing a release button halfway, and may perform exposure processing according to a second release signal generated by pressing the release button all the way.

Locations of the zoom lens 111 and the focus lens 113 are controlled by a zoom lens driving unit 112 and a focus lens driving unit 114, respectively. For example, a wide-angle zoom signal reduces a focal length of the zoom lens 111, which widens a viewing angle, and a telephoto-zoom signal increases the focal length of the zoom lens 111, which narrows the viewing angle. The location of the focus lens 113 is adjusted after the location of the zoom lens 111 is established, and thus the viewing angle is not affected by the location of the focus lens 113. The opening of the aperture 115 is controlled by an aperture driving unit 116. A sensitivity of the imaging device 117 is controlled by an imaging device control unit 118.

The zoom lens driving unit 112, the focus lens driving unit 114, the aperture driving unit 116, and the imaging device control unit 118 control the corresponding elements according to a result of operations of a CPU 200 with respect to exposure information, focal information, and the like.

In regard to a process of forming an image signal, an image signal output from the imaging device 117 is output to an image signal processing unit 120. If the image signal output from the imaging device 117 is an analog signal, the image processing unit 120 converts the analog signal to a digital signal, and performs various image processing on the converted digital signal. The image signal on which image processing is performed is temporarily stored in a storage unit 130.

More specifically, the image signal processing unit 120 performs signal processing, such as auto white balance, auto exposure, gamma correction, etc. to convert image data according to a human's angle of vision, improves image quality, and outputs the image signal having the improved image quality. An image signal processing unit 120 performs image processing, such as color filter interpolation, color matrix, color correction, color enhancement, etc.

In particular, the image signal processing unit 120 of the current embodiment may provide one or more low dynamic range images of different exposure levels and classify the low dynamic range images as a saturation region, an under-saturation region, and a non-saturation region, respectively. The image signal processing unit 120 may compare the low dynamic range images and generate feature maps indicating a similarity between patterns of the under-saturation region and the non-saturation region. The image signal processing unit 120 may convert pixels included in the feature maps into a moving pixel and a non-moving pixel, display the moving pixel and the non-moving pixel, generate final feature maps, compare the final feature maps with the low dynamic range images, and define a moving region and a non-moving region included in the low dynamic range images. The image signal processing unit 120 may remove noise from the defined moving region and non-moving region by using different filters and generate a radiance map corresponding to the low dynamic range images by setting a weight of the moving region from which the noise is removed lower than that of the non-moving region from which the noise is removed. The operation of the image signal processing unit 120 will be described in more detail with reference to FIGS. 2 and 4.

The storage unit 130 may include a program storage unit in which a program regarding an operation of the digital camera 100 is stored irrespective of whether power is supplied or not, and a main storage unit in which the image data and other data are temporarily stored while the power is supplied.

The program storage unit stores an operating program used to operate the digital camera 100 and various application programs. The CPU 200 controls the elements according to the programs stored in the program storage unit.

The storage unit 130 temporarily stores an image signal output from the image signal processing unit 120 or an auxiliary storage unit 140.

The storage unit 130 may be directly connected to a power unit 160 while power is supplied thereto so as to operate the digital camera 100. Thus, a code previously stored in the program storage unit may be copied and changed into an executable code so as to facilitate booting of the digital camera 100, and data stored in the main storage unit may be promptly read when the digital camera 100 is rebooted.

The image signal stored in the main storage unit is output to a display driving unit 155 and is converted into an analog signal and simultaneously is converted into an image signal in an optimal display manner. The converted image signal is displayed on a display unit 150 and is viewed as an image for a user. The display unit 150 continuously displays the image signal obtained by the imaging device 117 and acts as a viewfinder used to determine a photographing range during a photographing mode. The display unit 150 may use various display devices, such as a liquid crystal display (LCD), an organic light emitting display (OLED), an electrophoresis display device (EDD), etc.

In regard to a process of recording the generated image signal, the image signal is temporarily stored in the storage unit 130. Various types of information regarding the image signal and the image signal itself are stored in the auxiliary storage unit 140. The image signal and data are output to a compression and extension unit 145. The compression and extension unit 145 performs compression processing, i.e. encoding processing such as JPEG, in an optimal storage manner by using a compression circuit, forms an image file, and stores the image file in the auxiliary storage unit 140.

The auxiliary storage unit 140 may use various types of magnetic storage media such as a hard disk drive or a floppy disk, etc. in addition to a static semiconductor memory such as a portable flash memory, etc. or a semiconductor memory in a card shape or a stick shape such as a freely attachable card type flash memory.

In regard to a process of reproducing an image, the image file compressed and recorded in the auxiliary storage unit 140 is output to the compression and extension unit 145, extension processing is performed, i.e. decoding processing, by using an extension circuit, and an image signal is extracted from the image file. The image signal is output to the storage unit 130. The image signal is temporarily stored in the storage unit 130, and may be reproduced as a predetermined image on the display unit 150 through the display driving unit 155.

Meanwhile, the digital camera 100 includes a manipulation unit 170 that receives an external signal from the user. The manipulation unit 170 may include a shutter-release button, a power button, a wide-angle-zoom button, a telephoto-zoom button, and various other function buttons. The shutter-release button is opened and closed to expose the imaging device 117 to light for a predetermined amount of time. The power button is used to power on and off the digital camera 100. The wide-angle-zoom button and the telephoto-zoom button are used to widen or narrow a viewing angle according to an input. The remaining function buttons are used to select a character input mode, a photographing mode, a playback mode, a white balance setup function, an exposure setup function, and the like.

The digital camera 100 includes a flash 181 and a flash driving unit 182 for driving the flash 181. The flash 181 is a light emitting device for instantly illuminating a subject in a dark location.

A speaker 183 and a lamp 185 may output a sound signal and a light signal, respectively, and inform the user about an operating state of the digital camera 100. In particular, when a photographing condition when the user sets a photographing variable and a photographing condition when the user desires to perform photographing are different from each other during a passive mode, the speaker 183 or the lamp 185 may output a notification signal notifying the user about such a difference as a warning sound or an optical signal. A speaker driving unit 184 may control a type of sound, a volume thereof, etc. of the speaker 183. A lamp driving unit 186 may control whether the lamp 185 emits a light, a time taken for the lamp 185 to emit the light, a type of the light emitted by the lamp 185, etc.

The CPU 200 may process operations according to the operating system and application programs stored in the storage unit 130, may temporarily store a result of processed operations, and may control the corresponding elements according to the result of processed operations so as to operate the digital camera 100.

The image signal processing unit 120 will now be described in more detail with reference to FIGS. 2 and 3.

Figure 2:
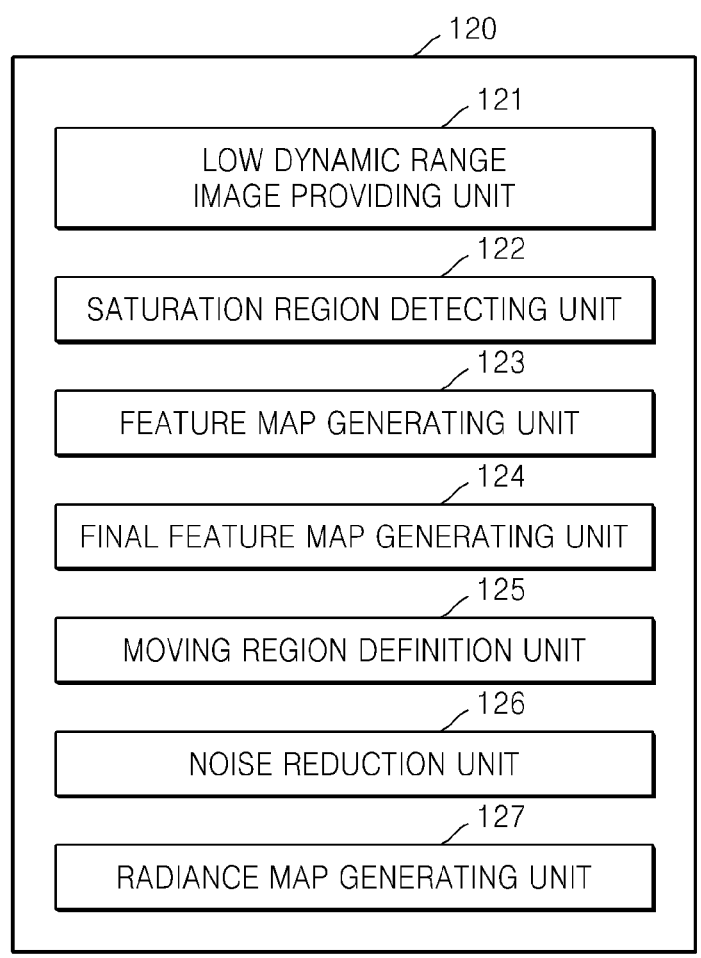
FIG. 2 is a block diagram of an image signal processing unit of FIG. 1 according to an exemplary embodiment of the invention.

FIG. 2 is a block diagram of the image signal processing unit 120 according to an exemplary embodiment of the invention. Referring to FIG. 2, the image signal processing unit 120 includes a low dynamic range image providing unit 121 that provides one or more low dynamic range images having difference exposure levels. The low dynamic range images are images that can be obtained by using exposure values provided by the digital camera 100. In the current embodiment, the low dynamic range images may be one or more low dynamic range images captured according to different exposure times by using an auto exposure bracketing (AEB) function of the digital camera 100. For descriptive convenience, the number of the low dynamic range images is 3. More specifically, the three low dynamic range images include a first image LDR1 captured using an insufficient exposure by reducing exposure time, a second image LDR2 captured using an appropriate exposure by appropriately setting exposure time, and a third image LDR3 captured using excessive exposure by increasing an exposure time. However, the invention is not limited thereto, and the number of the low dynamic range images may be four or five captured according to different exposure times.

A saturation region detecting unit 122 classifies each of the low dynamic range images provided by the low dynamic range image providing unit 121 into regions including a saturation region, an under-saturation region, and a non-saturation region. The saturation region is a region saturated by photographing a value exceeding a dynamic range that can be stored or represented by the digital camera 100. The under-saturation region is a dark region in a low dynamic range image captured contrary to the saturation region. The non-saturation region is a region excluding the saturation region and the under-saturation region. The saturation region, the under-saturation region, and the non-saturation region are classified according to an intensity value of an image. The intensity value is one of a plurality of feature values, such as a brightness value of a pixel, a color value thereof, etc. The saturation region is a region having the maximum intensity value 255 that can be stored or represented by an image. The under-saturation region is a region having the minimum intensity value 0 that can be stored or represented by the image. The non-saturation region is a region having intensity values 1 through 254 other than the maximum and minimum intensity values 255 and 0. The saturation region detecting unit 122 may receive the first image LDR1 and output a 1' image LDT1' displayed as the saturation region, the under-saturation region, and the non-saturation region. The 1' image LDR1' may be white having 255 as a brightness value of the saturation region, black having 0 as a brightness value of the non-saturation region, and gray having 128 as a brightness value of the under-saturation region. In the same manner, the saturation region detecting unit 122 may receive the second image LDR2 and output a 2' image LDT2' displayed as the saturation region, the under-saturation region, and the non-saturation region. Also, the saturation region detecting unit 122 may receive the third image LDR3 and output a 3' image LDT3' displayed as the saturation region, the under-saturation region, and the non-saturation region.

A feature map generating unit 123 compares the non-saturation regions of the low dynamic range images displayed as the saturation regions, the under-saturation regions, and the non-saturation regions, and generates feature maps indicating a similarity between patterns of the non-saturation regions. More specifically, the feature map generating unit 123 compares the 2' image LDR2' and the 1' image LDR1' and compares the 2' image LDR2' and the 3' image LDR3'. In this regard, the feature map generating unit 123 compares only the patterns of the non-saturation regions excluding the saturation regions and the under-saturation regions of the low dynamic range images since images overlap due to a false detection of the saturation regions and the under-saturation regions. The false detection refers to a non-moving region being falsely classified as a moving region by an exposure difference or a noise. Meanwhile, a similarity between patterns of specific regions may be indicated as a value between 0 and 1 by using zero-mean normalized cross correlation (ZNCC).

Figure 3:
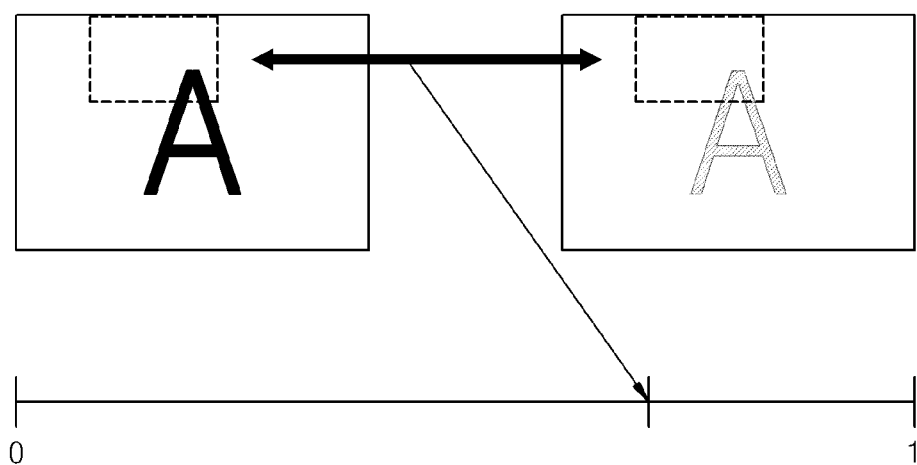
FIG. 3 illustrates a similarity between patterns by using zero-mean normalized cross correlation (ZNCC)

FIG. 3 illustrates a similarity between patterns by using the ZNCC. Referring to FIG. 3, masks having predetermined sizes are disposed in the same locations of a reference image and an input image, brightness of pixels included in the masks, edge components thereof, color coordinates thereof, and the like are compared to each other, such comparisons are normalized, and a correlation therebetween is indicated as a value between 0 and 1. If the correlation is closer to 0, the similarity between the patterns is low. If the correlation is closer to 1, the patterns are the same as or similar to each other. A method of determining the similarity between the patterns by using the ZNCC is well known to one of ordinary skill in the art in the image processing field, and thus a detailed description thereof will be omitted.

The feature map generating unit 123 may compare the non-saturation regions of the 2' image LDR2' and the 1' image LDR1' and generate a first feature map FM1 that represents the similarity between the patterns as a brightness value between 0 and 255. In this regard, if the correlation is 0 through the ZNCC, the brightness value is 0, and if the correlation is 1 through the ZNCC, the brightness value is 255. In the same manner, the feature map generating unit 123 may compare the non-saturation regions of the 2' image LDR2' and the 3' image LDR3' and generate a second feature map FM2 that represents the similarity between the patterns as the brightness value between 0 and 255. In this regard, the saturation regions of the 1' image LDR1'1, the 2' image LDR2', and the 3' image LDR3' are represented as the brightness value 255 in the first feature map FM1 and the second feature map FM2. Further, the under-saturation regions of the 1' image LDR1'1, the 2' image LDR2', and the 3' image LDR3' are represented as a brightness value 0 in the first feature map FM1 and the second feature map FM2.

A final feature map generating unit 124 converts pixels included in the first feature map FM1 and the second feature map FM2 generated by the feature map generating unit 123 into moving pixels and non-moving pixels and generates final feature maps. That is, the final feature map generating unit 124 generates a first final feature map FFM1 that displays the first feature map FM1 as a binary value, and generates a second final feature map FFM2 that displays the second feature map FM2 as the binary value. The final feature map generating unit 124 will be described in more detail with reference to FIG. 4.

A moving region definition unit 125 compares the final feature maps generated from the final feature map generating unit 124 and the low dynamic range images and defines moving regions and non-moving regions included in the low dynamic range images. More specifically, the final feature maps are used as masks to define the moving regions and the non-moving regions included in the low dynamic range images. For example, if a location 100, 100 in horizontal and vertical directions in the final feature maps is a moving region, a location 100, 100 in horizontal and vertical directions in the low dynamic range images is the moving region.

The moving region definition unit 125 defines pixels of the first image LDR1 corresponding to the moving pixels included in the first final feature map FFM1 as the moving region. In the same manner, the moving region definition unit 125 defines pixels of the first image LDR1 corresponding to the non-moving pixels included in the first final feature map FFM1 as the non-moving region. In a similar manner, the moving region definition unit 125 compares the second final feature map FFM2 and the third image LDR3 and defines a moving region corresponding to the moving pixels and a non-moving region corresponding to the non-moving pixels. Thus, the moving regions and the non-moving regions of the first image LDR1 and the second image LDR2 are defined.

In particular, the saturation regions and the under-saturation regions are not used to define moving regions in order to reduce an error due to a false detection that may occur in the saturation regions and the under-saturation regions, thereby more accurately defining the moving regions and the non-moving regions.

A noise removing unit 126 removes noise from the moving regions defined by the moving region definition unit 125 by using a first noise reduction filter and removes noise from the non-moving regions defined by the moving region definition unit 125 by using a second noise reduction filter. In this regard, the first noise reduction filter is a spatio-temporal noise reduction filter designed by using a 3D structure tensor of the moving regions, and the second noise reduction filter is a spatial noise reduction filter designed by using a 2D structure tensor of the non-moving regions.

A method of obtaining a kernel of the spatio-temporal noise reduction filter is as follows. The 3D structure tensor is obtained from the low dynamic range images, an eigenvalue of the 3D structure tensor is obtained, a mathematical modification is applied to the eigenvalue, and a matrix is formed, and thus a 3D Gaussian kernel is designed. The kernel of the spatio-temporal noise reduction filter is designed to have a wide spatio-temporal flat part and a narrow edge part by analyzing a structural feature of an image. Thus, edge loss is spatially minimized, and image overlapping is temporally prevented. A method of obtaining a kernel of the spatial noise reduction filter is as follows. The 2D structure tensor is obtained from the low dynamic range images, an eigenvalue of the 2D structure tensor is obtained, a mathematical modification is applied to the eigenvalue, and a matrix is formed, and thus a 2D Gaussian kernel is designed. Meanwhile, the spatio-temporal noise reduction filter designs the Gaussian kernel by simultaneously reflecting differences between the low dynamic range images and differences between peripheral pixels. That is, the spatio-temporal noise reduction filter reflects both temporal and spatial features of the image. Meanwhile, the spatial noise reduction filter does not reflect the differences between the low dynamic range images and reflects the differences between peripheral pixels to design the Gaussian kernel. That is, the spatial noise reduction filter reflects only the spatial features of the image. In a non-moving image, the spatial noise reduction filter may be used to remove noise from the non-moving image and additionally remove temporal noise through a weight average.

In the current embodiment, different noise reduction filters are used for a moving region and a non-moving region, thereby more efficiently removing the noise. Furthermore, different types of filters are used for the moving region and the non-moving region, thereby achieving a fast operation speed.

A radiance map generating unit 127 generates a radiance map RM corresponding to the low dynamic range images from which noise is removed. The radiance map RM refers to a single image obtained from one or more low dynamic range images captured according to different exposure times. The radiance map RM refers to a high dynamic range image. A Debevec and Malik method is used to obtain the radiance map RM through the low dynamic range images. The Debevec and Malik method is well known in the image processing field and thus a detailed description thereof will be omitted.

In the current embodiment, the radiance map generating unit 127 generates the radiance map RM corresponding to the low dynamic range images by making a weight of the moving regions from which noise is removed smaller than a weight of the non-moving regions from which noise is removed. The radiance map RM refers to a high dynamic range image. More specifically, the radiance map generating unit 127 generates the radiance map RM by making the weight of the moving regions from which noise is removed and which are included in the first image LDR1 and the third image LDR3 smaller than the weight of the non-moving regions from which noise is removed and which are included in the first image LDR1 and the third image LDR3. The second image LDR2 is a reference image for generating the high dynamic range image, and thus the second image LDR2 may be used to generate the radiance map RM by removing noise from the second image LRD2 by using a general noise reduction filter without defining the moving region and the non-moving region included in the second image LDR2.

Figure 4:
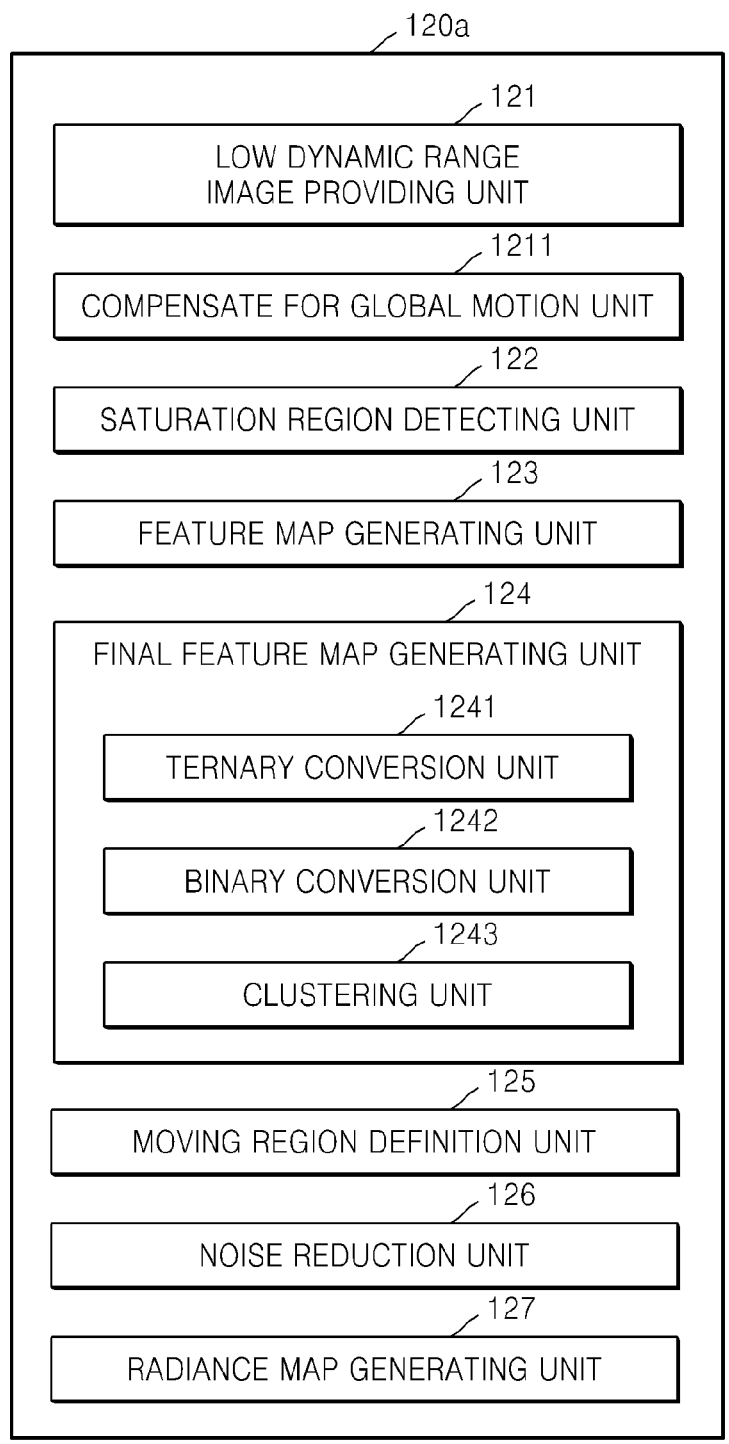
FIG. 4 is a block diagram of the image signal processing unit of FIG. 1 according to another exemplary embodiment of the invention.

FIG. 4 is a block diagram of an image signal processing unit 120a according to another exemplary embodiment of the invention. The image signal processing unit 120a of FIG. 4, which includes the low dynamic range image providing unit 121, the saturation region detecting unit 122, the feature map generating unit 123, the final feature map generating unit 124, the moving region definition unit 125, the noise removing unit 126, and the radiance map generating unit 127, is similar to the image signal processing unit 120 of FIG. 2. However, the image signal processing unit 120a of FIG. 4 further includes a global moving compensation unit 1211. Furthermore, the final feature map generating unit 124 of the image signal processing unit 120a of FIG. 4 includes a ternary conversion unit 1241, a binary conversion unit 1242, and a clustering unit 1243. Some differences between the image signal processing unit 120a of FIG. 4 and the image signal processing unit 120 of FIG. 2 will now be described in detail.

The global motion compensation unit 1211 compensates for a global motion of each of the first image LDR1 and the third image LDR3 with respect to the second image LDR2. The global motion indicates that all pixels are shifted due to a change in the location of the digital camera 100 while the second image LDR2 and the third image LDR3 are captured after the first image LDR1 is captured. The compensation of the global motion is to compensate for the shifted pixels and align pixels of the first image LDR1, the second image LDR2, and the third image LDR3 so that they correspond to each other.

Figure 5:
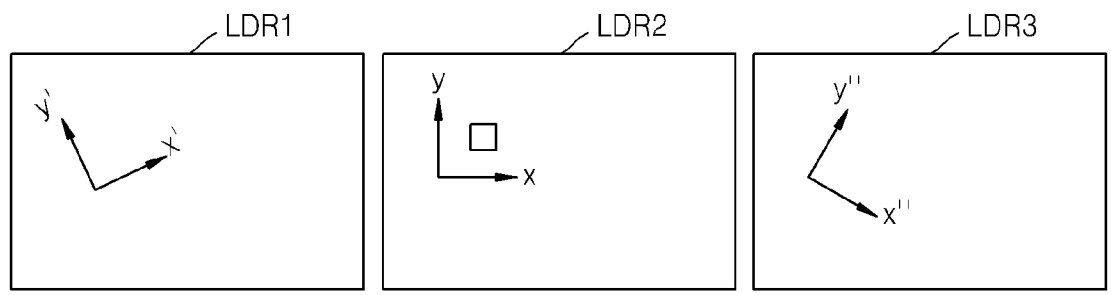
FIG. 5 illustrates a process of compensating for a global motion according to an exemplary embodiment of the invention.
Figure 5:
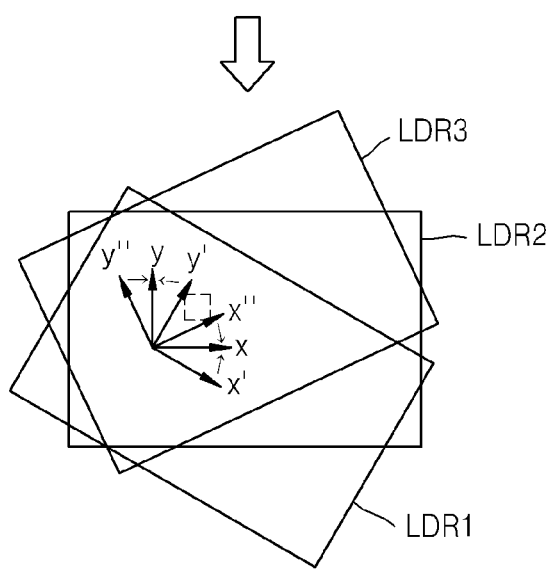

FIG. 5 illustrates a process of compensating for a global motion according to an exemplary embodiment of the invention. Referring to FIG. 5, shifting of all pixels are compensated for with respect to the second image LDR2, and pixels of the first image LDR1, the second image LDR2, and the third image LDR3 are aligned so that they correspond to each other. Such a process compensates for the pixels shifted due to a hand shake that occurs while a plurality of images are obtained. The global motion may remove an error caused by the hand shake.

The final feature map generating unit 124 converts the pixels included in the first feature map FM1 and the second feature map FM2 generated by the feature map generating unit 123 into moving pixels and non-moving pixels, thereby generating the first final feature map FFM1 corresponding to the first feature map FM1 and the second final feature map FFM2 corresponding to the second feature map FM2. The final feature map generating unit 124 may include the ternary conversion unit 1241, the binary conversion unit 1242, and the clustering unit 1243. Three processes of generating final feature maps are performed by the ternary conversion unit 1241, the binary conversion unit 1242, and the clustering unit 1243. However, the invention is not limited thereto, and only some of the three processes may be performed, or a process well known in an image processing field may be further performed.

The ternary conversion unit 1241 defines the moving pixels, the non-moving pixels, and unknown pixels based on feature values of the pixels included in the first feature map FM1 and the second feature map FM2. The feature values may be optionally set values or may be values previously stored during the manufacturing of the digital camera 100. The feature values may be brightness values and include a first feature value and a second feature value having a greater brightness than the first feature value. The ternary conversion unit 1241 compares a brightness value of a specific pixel included in the first feature map FM1 and the first feature value and/or the second feature value. For example, if the brightness value of the specific pixel is smaller than the first feature value, the ternary conversion unit 1241 defines the specific pixel as a moving pixel. If the brightness value of the specific pixel is greater than the first feature value and is smaller than the second feature value, the ternary conversion unit 1241 defines the specific pixel as an unknown pixel. If the brightness value of the specific pixel is greater than the second feature value, the ternary conversion unit 1241 defines the specific pixel as a non-moving pixel. The moving pixel, the non-moving pixel, and the unknown pixel may be identified as brightness values. For example, the moving pixel may be white having 255 as a brightness value, the non-moving pixel may be black having 0 as a brightness value, and the unknown pixel may be gray having 128 as a brightness value. The ternary conversion unit 1241 may generate a 1' feature map FM1' and a 2' feature map FM2' by reconfiguring three pixel brightness values.

In the current embodiment, the ternary conversion unit 1241 may more precisely classify the moving pixels and the non-moving pixels than the binary conversion 1242 does.

The secondary conversion unit 1242 converts unknown pixels included in the 1' feature map FM1' and the 2' feature map FM2' generated by the ternary conversion unit 1241 into moving pixels and non-moving pixels by using an average of brightness values of peripheral pixels as a threshold value. More specifically, if brightness values of the unknown pixels included in the 1' feature map FM1' and the 2' feature map FM2' are smaller than the threshold value, the secondary conversion unit 1242 converts the unknown pixels into moving pixels that are white having 255 as a brightness value, and if the brightness values of the unknown pixels included in the 1' feature map FM1' and the 2' feature map FM2' are greater than the threshold value, the secondary conversion unit 1242 converts the unknown pixels into non-moving pixels that are black having 0 as a brightness value. The secondary conversion unit 1242 removes the unknown pixels, and reconfigures two pixel brightness values, thereby generating a 1" feature map FM1" and a 2" feature map FM2".

In the current embodiment, the secondary conversion unit 1242 converts the unknown pixels by using an average of brightness values of peripheral pixels of the unknown pixels as a threshold value, thereby more accurately removing the unknown pixels. The peripheral pixels may be pixels adjacent to the unknown pixels. However, the invention is not limited thereto, and the number and range of the peripheral pixels may be determined by a user or a manufacturer.

The clustering unit 1243 generates final feature maps by clustering the moving pixels and the non-moving pixels included in the 1" feature map FM1" and the 2" feature map FM2" generated by the secondary conversion unit 1242. More specifically, the clustering unit 1243 clusters the moving pixels and the non-moving pixels included in the 1" feature map FM1" and the 2" feature map FM2" by using a morphology operation.

Figure 6:
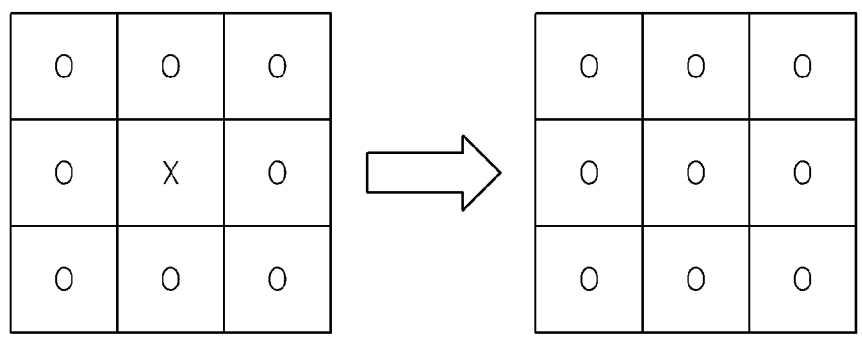
FIG. 6 illustrates a clustering process by using a morphology operation according to an exemplary embodiment of the invention.

FIG. 6 illustrates a clustering process by using the morphology operation according to an exemplary embodiment of the invention. Referring to FIG. 6, the clustering process by using the morphology operation is for determining correspondences between center pixels and peripheral pixels through a mask and changing the center pixels according to features of the peripheral pixels. Types of morphology operations include a dilation operation that fills in the peripheral pixels with respect to the center pixels, an erosion operation opposite to the dilation operation, an opening operation, a closing operation, and the like.

In the current embodiment, the clustering unit 1243 can correct falsely converted non-moving pixels and moving pixels.

In the current embodiment, when moving pixels and non-moving pixels are generated from an image, pixels of the image are classified as three types of pixels, which are moving pixels, unknown pixels, and non-moving pixels, and the unknown pixels are converted into the moving pixels and the non-moving pixels by using a threshold value of peripheral pixels, thereby more accurately defining a moving region. Furthermore, an error is removed through a clustering process, thereby increasing accuracy.

Figure 7:
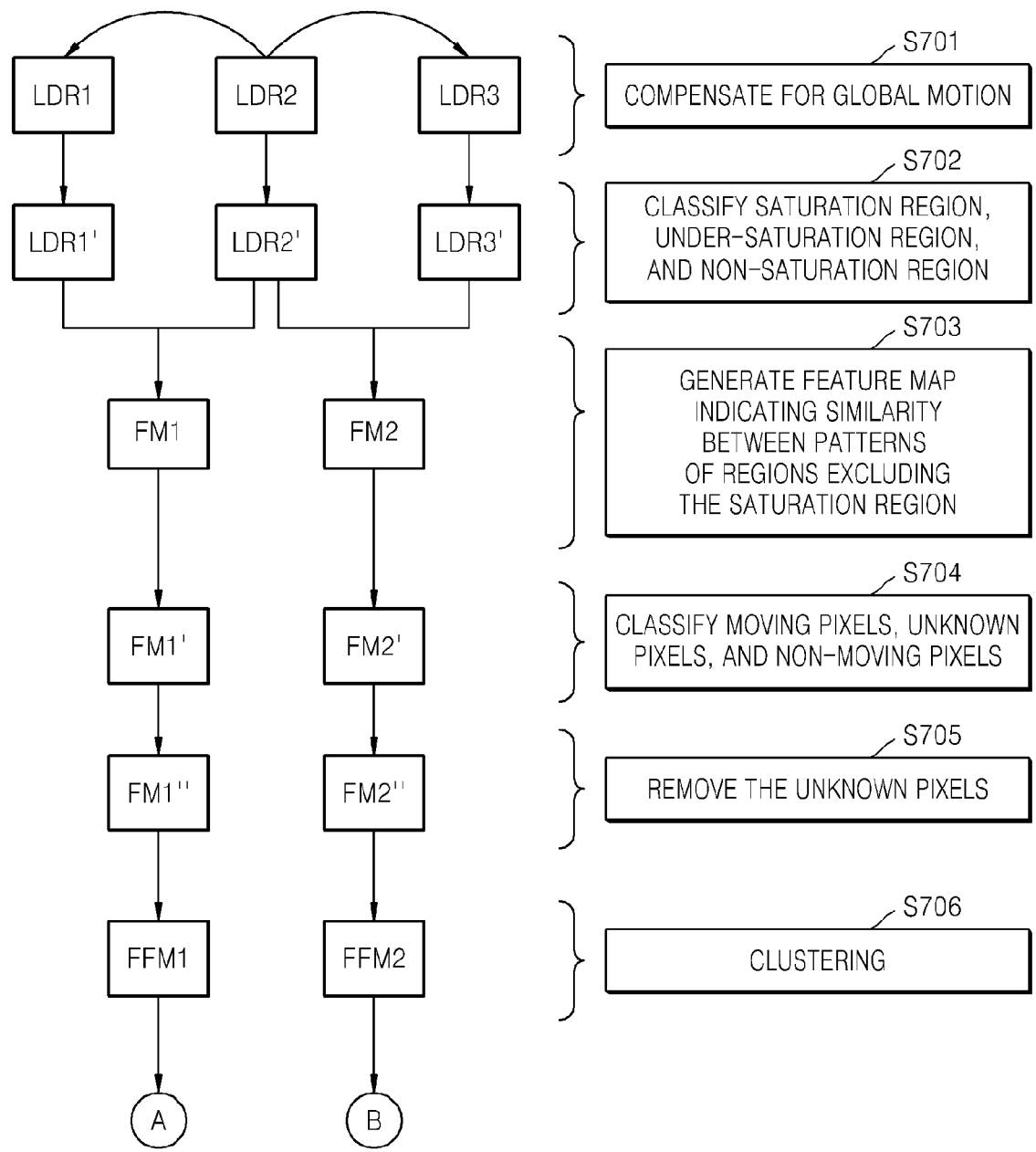
FIGS. 7 and 8 are block flow diagrams for explaining an image processing method according to an exemplary embodiment of the invention.
Figure 8:
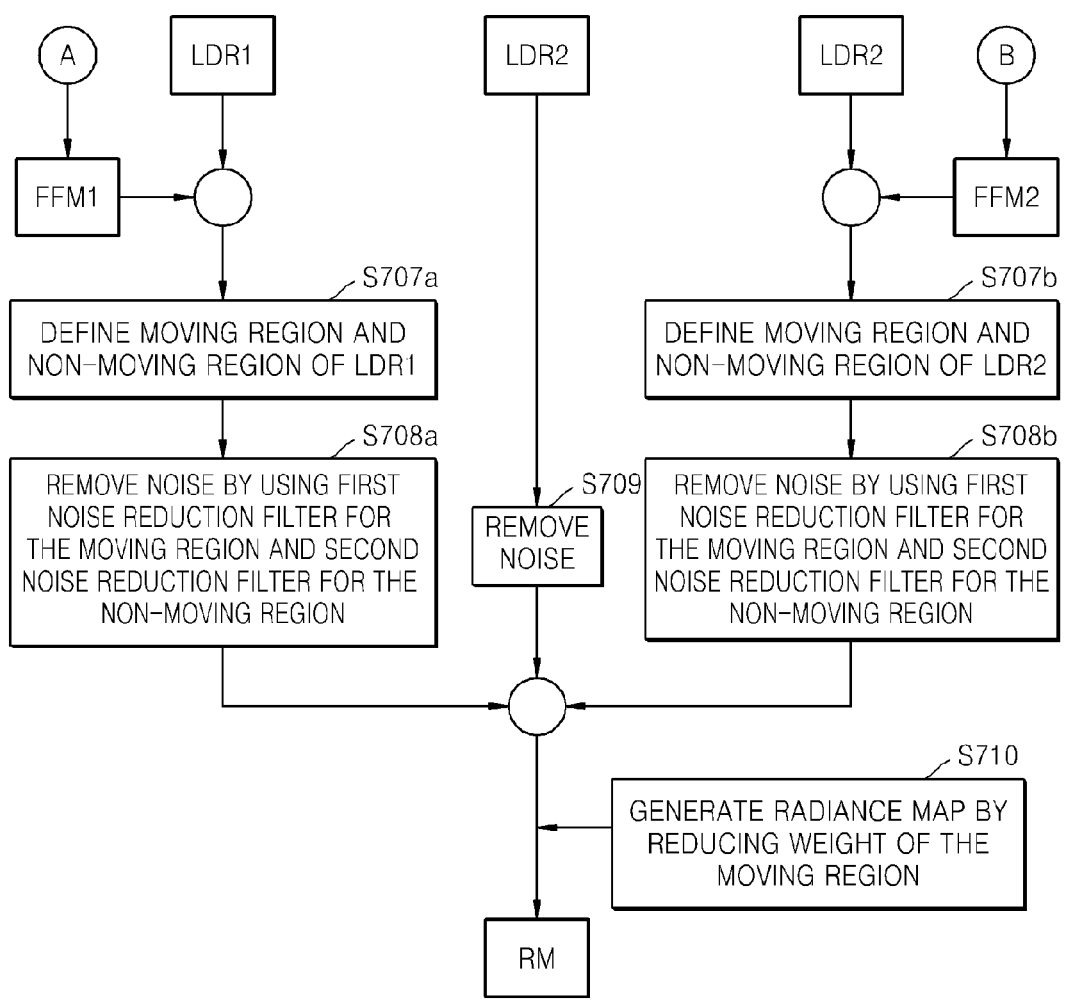

FIGS. 7 and 8 are block flow diagrams for explaining an image processing method according to an exemplary embodiment of the invention. Referring to FIG. 7, one or more low dynamic range images are captured at different exposure times by using an AEB function of the digital camera 100. For descriptive convenience, the low dynamic range images include the first image LDR1 captured at an insufficient exposure by reducing exposure time, the second image LDR2 captured at an appropriate exposure by appropriately setting exposure time, and the third image LDR3 captured using excessive exposure by increasing the exposure time.

In the current embodiment, the radiance map RM in which images do not overlap and noise is effectively removed is obtained from the first through third images LDR1, LDR2, and LDR3.

In operation S701, a global motion of each of the first image LDR1 and the third image LDR3 is compensated for with respect to the second image LDR2. Such a compensation of the global motion results in a compensation of shifting of all pixels, thereby preventing images from overlapping and removing noise due to a hand shake or a change in the location of the digital camera 100. Operation S701 may be skipped according to selection by the user.

In operation S702, the first through third images LDR1, LDR2, and LDR3 having compensated global motions are received, and the 1' image LDR1', the 2' image LDR2', and the 3' image LDR3' are classified into regions including a saturation region, an under-saturation region, and a non-saturation region, and are output. Operation S703 is performed to generate a feature map by only using the non-saturation region excluding the saturation region and the under-saturation region. The saturation region is a region having the maximum intensity value 255 that can be stored or represented by an image. The under-saturation region is a region having the minimum intensity value 0 that can be stored or represented by the image. Since false detection mainly occurs in the saturation region and the under-saturation region, the saturation region and the under-saturation region cannot be used to prevent images from overlapping due to the false detection.

In operation S703, the 1' image LDR1', the 2' image LDR2', and the 3' image LDR3' are received, the 2' image LDR2' and the 1' image LDR1' are compared to each other with respect to the 2' image LDR2', and the first feature map FM1 indicating a similarity between patterns of the non-saturation regions of the 2' image LDR2' and the 1' image LDR1' is generated. In the same manner, the 2' image LDR2' and the 3' image LDR3' are compared to each other with respect to the 2' image LDR2', and the second feature map FM2 indicating a similarity between patterns of the non-saturation regions of the 2' image LDR2' and the 3' image LDR3' is generated. A ZNCC are used to determine a similarity between patterns of specific regions. A low similarity between patterns of the specific region corresponds to black having 0 as a brightness value. The same pattern corresponds to white having 255 as the brightness value. Therefore, the brightness value may indicate the similarity between the patterns of the 2' image LDR2' and the 1' image LDR1' or the 2' image LDR2' and the 3' image LDR3'. Operation S703 is performed to obtain a final feature map used as a mask for identifying a moving region and a non-moving region. Although the ZNCC is used to determine a similarity between patterns, the invention is not limited thereto, and the similarity between patterns may be determined by using edge analysis, intensity derivation analysis, a similarity comparison filter, and the like.

In operation S704, pixels included in the first feature map FM1 and the second feature map FM2 are classified as moving pixels, unknown pixels, and non-moving pixels, and the 1' feature map FM1' and the 2' feature map FM2' having three brightness values are generated. The moving pixels, the unknown pixels, and the non-moving pixels may be defined by using a feature value that is the brightness value. The brightness value indicates a similarity between patterns. The same patterns indicate the non-moving pixels. A low similarity between patterns indicates the moving pixels. In operation S704, the pixels are classified as three types of pixels according to a moving level, thereby increasing precision compared to classification of the pixels as two types of pixels.

In operation S705, the unknown pixels included in the first feature map FM1 and the second feature map FM2 are converted into the moving pixels and the non-moving pixels by using an average of brightness values of peripheral pixels as a threshold value, and the 1" feature map FM1" and the 2"

feature map FM2" having two brightness values are generated. In operation S705, moving pixels and non-moving pixels included in an image are identified from each other. In the current embodiment, the unknown pixels are converted by using the average of brightness values of peripheral pixels as the threshold value, thereby more accurately removing the unknown pixels.

In operation S706, the moving pixels and the non-moving pixels included in the 1" feature map FM1" and the 2" feature map FM2" are clustered by using a morphology operation, and the first final feature map FFM1 and the second final feature map FFM2 are generated. In operation S706, an error that may occur during a conversion process is removed, thereby more precisely generating the first final feature map FFM1 and the second final feature map FFM2.

Operations S701 through S706 are to generate the first final feature map FFM1 and the second final feature map FFM2 from the low dynamic range images. A process of removing noise in the low dynamic range images by using the first final feature map FFM1 and the second final feature map FFM2 and generating the radiance map RM will now be described with reference to FIG. 8.

Referring to FIG. 8, in operations S707a and S707b, the first image LDR1 and the first final feature map FFM1 are compared to each other to define a moving region and a non-moving region of the first image LDR1, and the third image LDR3 and the second final feature map FFM2 are compared to each other to define a moving region and a non-moving region of the third image LDR3. That is, the moving regions and the non-moving regions of the low dynamic range images that are insufficiently exposed and excessively exposed are defined by using the first final feature map FFM1 and the second final feature map FFM2 as masks. The first image LDR1 and the third image LDR3 may be images having compensated global motions or may be initially captured images. In operations S707a and S707b, when noise is removed from an image, a moving region and a non-moving region of the image are defined in order to use different filters for the moving region and the non-moving region.

In operations S708a and S708b, the noise is removed by using a first noise reduction filter for the defined moving region and a second noise reduction filter for the defined non-moving region. The first noise reduction filter is a spatiotemporal noise reduction filter, and the second noise reduction filter is a spatial noise reduction filter. In operations S708a and S708b, different noise reduction filters are used by identifying the moving region and the non-moving region, thereby increasing noise reduction efficiency and reducing the time taken to remove the noise.

Meanwhile, in operation S709, a moving region and a non-moving region of the second image LDR2 are not defined, and a general noise reduction filter may be used to remove noise.

In operation S710, the radiance map RM corresponding to the low dynamic range images from which noise is removed is generated. The radiance map RM may be generated by using the Debevec and Malik method, and using a weight of the moving region, which is smaller than that of the non-moving region. In operation S710, the radiance map RM is generated by using the weight of the moving region, which is smaller than that of the non-moving region, thereby preventing images from overlapping in the moving region.

Operations S707a through 710 are for generating the radiance map RM from which noise is removed by using the first final feature map FFM1 and the second final feature map FFM2 and the low dynamic range images. In particular, when the low dynamic images are captured under low illumination or high sensitivity conditions, noise can be efficiently removed by using different noise reduction filters for moving regions and non-moving regions.

A display image obtained through tone mapping from a radiance map on which image processing is performed is distinguished from a contrast image on which image processing is not performed as follows.

The image processing method of the current embodiment generates feature maps from regions other than a saturation region with respect to a low dynamic range image captured using an appropriate exposure. Thus, according to the image processing method of the current embodiment, a moving region or a non-moving region of the contrast image is the same as a moving region or a non-moving region of the low dynamic range image captured using an appropriate exposure or, in particular, images do not overlap in the saturation region.

In particular, the conventional noise reduction technology does not remove noise in a low illumination below 30 Lux, whereas, the image processing method of the current embodiment removes noise from a final display image obtained by combining images obtained by using an AEB function of a digital camera in the low illumination and improves a dynamic range of the final display image.

As described above, a feature map is generated through regions excluding a saturation region, and a final feature map from which unknown pixels are removed is generated by using an average of brightness values of peripheral pixels as a threshold value, thereby more precisely detecting a moving region and a non-moving region of an image.

Different types of filters are used to remove noise from the precisely detected moving region and non-moving region, and a radiance map is generated by using a weight of the moving region, which is smaller than that of the non-moving region, thereby preventing images from overlapping in the radiance map and removing noise from the radiance map.

The invention can also be embodied as computer-readable code on a computer-readable storage medium. The computer-readable storage medium is any data storage device that can store data which can be thereafter read by a computer system.

Examples of the computer-readable storage medium include read-only memory (ROM), random-access memory (RAM), CD-ROMs, magnetic tapes, floppy disks, optical data storage devices, etc. The computer-readable storage medium can also be distributed over network coupled computer systems so that the computer-readable code is stored and executed in a distributed fashion. The computer readable medium may be limited to non-transitory computer readable medium. Also, functional programs, codes, and code segments for accomplishing embodiments of the invention can be programmed by programmers of ordinary skill in the art to which the invention pertains.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the specification are merely used to describe particular embodiments, and are not intended to limit the invention. An expression used in the singular encompasses the expression of the plural, unless it has a clearly different meaning in the context. In the current specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented using algorithms that are executed in one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

While the invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the invention.

What is claimed is:

1. An image processing apparatus comprising:
   a low dynamic range image providing unit configured to provide one or more low dynamic range images having different exposure levels;
   a saturation region detecting unit configured to classify each of the one of more low dynamic range images as a saturation region, an under-saturation region, and a non-saturation region with respect to an intensity value;
   a feature map generating unit configured to compare the patterns of the non-saturation regions excluding the saturation regions and the under-saturation regions of the one of more low dynamic range images and generating feature maps indicating a similarity between the patterns of the non-saturation regions;
   a final feature map generating unit configured to convert pixels included in the feature maps into moving pixels and non-moving pixels and generating final feature maps;
   a moving region definition unit configured to compare the final feature maps and the one or more low dynamic range images and defining moving regions and non-moving regions included in the one or more low dynamic range images;
   a noise reduction unit configured to remove noise from the moving regions and the non-moving regions by using a first noise reduction filter for the moving regions and a second noise reduction filter for the non-moving regions; and
   a radiance map generating unit configured to generate a radiance map corresponding to the one or more low dynamic range images by making a weight of the moving regions from which noise is removed smaller than a weight of the non-moving regions from which noise is removed.

2. The image processing apparatus of claim 1, further comprising: a global motion compensation unit configured to compensate for a global motion of each of the one or more low dynamic range images having different exposure levels.

3. The image processing apparatus of claim 1, wherein the final feature map generating unit comprises:
   a ternary conversion unit configured to define the pixels included in the feature maps as moving pixels, unknown pixels, and non-moving pixels with respect to feature values;
   a binary conversion unit configured to convert the unknown pixels that are included in the feature maps and defined by the ternary conversion unit into the moving pixels or the non-moving pixels by using an average of brightness values of peripheral pixels as a threshold value; and
   a clustering unit configured to cluster the moving pixels and the non-moving pixels that are included in the feature maps and converted by the binary conversion unit and generating the final feature maps.

4. The image processing apparatus of claim 3, wherein the low dynamic range image providing unit is further configured to provide the one or more low dynamic range images as a first image that is insufficiently exposed, a second image that is appropriately exposed, and a third image that is excessively exposed.

5. The image processing apparatus of claim 4, wherein the saturation region detecting unit is further configured to divide each of a first image, a second image, and a third image into the saturation region, the under-saturation region, and the non-saturation region, respectively, and
   wherein the feature map generating unit is further configured to compare the second image of the saturation region with the non-saturation region of the first image and to generate a first feature map indicating a similarity between patterns of the non-saturation region as a brightness value by using zero-mean normalized cross correlation (ZNCC), and to compare the second image of the saturation region with the non-saturation region of the third image and to generate a second feature map indicating a similarity between patterns of the non-saturation region as a brightness value by using the ZNCC.

6. The image processing apparatus of claim 5, wherein the feature values comprises a first feature value and a second feature value having a brightness value greater than the first feature value, and wherein the ternary conversion unit is further configured to define the pixels as the moving pixels, if brightness values of the pixels included in the first feature map and the second feature map are smaller than the first feature value, to define the pixels as the unknown pixels, if the brightness values of the pixels included in the first feature map and the second feature map are greater than the first feature value and smaller than the second feature value, and to define the pixels as the non-moving pixels, if the brightness values of the pixels included in the first feature map and the second feature map are greater than the second feature value.

7. The image processing apparatus of claim 6, wherein the binary conversion unit is further configured to convert the unknown pixels into the moving pixels, if brightness values of the unknown pixels are smaller than the threshold value, and to convert the unknown pixels into the non-moving pixels, if brightness values of the unknown pixels are greater than the threshold value.

8. The image processing apparatus of claim 7, wherein the clustering unit is further configured to cluster the moving pixels and the non-moving pixels by applying a morphology operation to the moving pixels and the non-moving pixels.

9. The image processing apparatus of claim 8, wherein the final feature maps comprises a first final feature map corresponding to the first feature map and a second final feature map corresponding to the second feature map, and wherein the moving region definition unit is further configured to compare the first final feature map with the first image and define the moving regions corresponding to the moving pixels and the non-moving regions corresponding to the non-moving pixels, and to compare the second final feature map with the third image and define the moving regions corresponding to the moving pixels and the non-moving regions corresponding to the non-moving pixels.

10. The image processing apparatus of claim 1, wherein the first noise reduction filter is a spatio-temporal noise reduction filter designed using a 3D structure tensor of the moving regions, and the second noise reduction filter is a spatial noise reduction filter designed using a 2D structure tensor of the non-moving regions.

11. The image processing apparatus of claim 9, wherein the radiance map generating unit is further configured to generate the radiance map corresponding to the first image, the second image, and the third image by using a Debevec and Malik method by making the weight of the moving regions from which noise is removed smaller than that of the non-moving regions from which noise is removed.

12. An image processing method comprising:
providing one or more low dynamic range images having different exposure levels;
classifying each of the one of more low dynamic range images as a saturation region, an under-saturation region, and a non-saturation region with respect to an intensity value;
comparing the patterns of the non-saturation regions excluding the saturation regions and the under-saturation regions of the one of more low dynamic range images and generating feature maps indicating a similarity between the patterns of the non-saturation regions;
defining the pixels included in the feature maps as moving pixels, unknown pixels, and non-moving pixels with respect to feature values;
converting the unknown pixels included in the feature maps into the moving pixels or the non-moving pixels by using an average of brightness values of peripheral pixels as a threshold value;
clustering the moving pixels and the non-moving pixels included in the feature maps having the converted unknown pixels and generating the final feature maps;
converting pixels included in the feature maps into moving pixels and non-moving pixels and generating final feature maps;
comparing the final feature maps and the one or more low dynamic range images and defining moving regions and non-moving regions included in the one or more low dynamic range images;
removing noise from the moving regions and the non-moving regions by using a first noise reduction filter for the moving regions and a second noise reduction filter for the non-moving regions; and
generating a radiance map corresponding to the one or more low dynamic range images by making a weight of the moving regions from which noise is removed smaller than a weight of the non-moving regions from which noise is removed.

13. The image processing method of claim 12, further comprising: compensating for a global motion of each of the one or more low dynamic range images having different exposure levels.

14. The image processing method of claim 12, wherein the one or more low dynamic range images comprise a first image that is insufficiently exposed, a second image that is appropriately exposed, and a third image that is excessively exposed.

15. The image processing method of claim 14, wherein each of the first image, the second image, and the third image is divided into the saturation region, the under-saturation region, and the non-saturation region, respectively, wherein the generating of the feature maps comprises:
comparing the second image of the saturation region with the non-saturation region of the first image and generating a first feature map indicating a similarity between patterns of the non-saturation region as a brightness value by using ZNCC, and comparing the second image of the saturation region with the non-saturation region of the third image and generating a second feature map indicating a similarity between patterns of the non-saturation region as a brightness value by using the ZNCC.

16. The image processing method of claim 15, wherein the feature values comprise a first feature value and a second feature value having a brightness value greater than the first feature value,
wherein the defining of the pixels included in the feature maps as moving pixels, unknown pixels, and non-moving pixels comprises:
if brightness values of the pixels included in the first feature map and the second feature map are smaller than the first feature value, defining the pixels as the moving pixels,
if the brightness values of the pixels included in the first feature map and the second feature map are greater than the first feature value and smaller than the second feature value, defining the pixels as the unknown pixels, and
if the brightness values of the pixels included in the first feature map and the second feature map are greater than the second feature value, defining the pixels as the non-moving pixels.

17. The image processing method of claim 16, wherein the converting of the unknown pixels comprises:

if brightness values of the unknown pixels are smaller than the threshold value, converting the unknown pixels into the moving pixels, and if brightness values of the unknown pixels are greater than the threshold value, converting the unknown pixels into the non-moving pixels.

18. The image processing method of claim 17, wherein the clustering of the moving pixels and the non-moving pixels comprises: clustering the moving pixels and the non-moving pixels by applying a morphology operation to the moving pixels and the non-moving pixels.

19. The image processing method of claim 18, wherein final feature maps comprise a first final feature map corresponding to the first feature map and a second final feature map corresponding to the second feature map, wherein the defining of the moving regions and the non-moving regions comprises:

comparing the first final feature map with the first image and defining the moving regions corresponding to the moving pixels and the non-moving regions corresponding to the non-moving pixels, comparing the second final feature map with the third image and defining the moving regions corresponding to the moving pixels and the non-moving regions corresponding to the non-moving pixels.

20. The image processing method of claim 12, wherein the first noise reduction filter is a spatio-temporal noise reduction filter designed by using a 3D structure tensor of the moving regions, and the second noise reduction filter is a spatial noise reduction filter designed by using a 2D structure tensor of the non-moving regions.

21. The image processing method of claim 19, wherein the generating of the radiance map comprises: generating the radiance map corresponding to the first image, the second image, and the third image by using a Debevec and Malik method by making the weight of the moving regions from which noise is removed smaller than the weight of the non-moving regions from which noise is removed.

22. The image processing method of claim 12, wherein the one of more low dynamic range images are captured under photographing conditions in which noise occurs.

23. An image processing method comprising:

capturing one or more low dynamic range images having different exposure levels; dividing each of the one of more low dynamic range images into regions including a saturation region, an under-saturation region, and a non-saturation region based on an intensity value of pixels of the images;

determining a similarity between patterns of the non-saturation regions excluding the saturation regions and the under-saturation regions among the one or more low dynamic range images;

defining moving regions and non-moving regions based on the determined similarity of the non-saturation regions among the one or more low dynamic range images;

removing noise from the moving regions and the non-moving regions by using a first noise reduction filter for the moving regions and a second noise reduction filter for the non-moving regions; and generating a radiance map composed from the one or more low dynamic range images with the noise removed.

* * * * *